US012670800B2

(12) United States Patent
Wythe

(10) Patent No.: US 12,670,800 B2
(45) Date of Patent: Jun. 30, 2026

(54) VEHICLE CONTROLLER

(71) Applicant: BAE SYSTEMS PLC, London (GB)

(72) Inventor: Robert Graham Wythe, Frimley Surrey (GB)

(73) Assignee: BAE SYSTEMS PLC, London (GB)

( * ) Notice: Subject to any disclaimer, the term of this patent is extended or adjusted under 35 U.S.C. 154(b) by 107 days.

(21) Appl. No.: 18/020,311

(22) PCT Filed: May 21, 2021

(86) PCT No.: PCT/GB2021/051235
§ 371 (c)(1),
(2) Date: Feb. 8, 2023

(87) PCT Pub. No.: WO2022/034278
PCT Pub. Date: Feb. 17, 2022

(65) Prior Publication Data
US 2023/0290257 A1 Sep. 14, 2023

(30) Foreign Application Priority Data
Aug. 10, 2020 (GB) .................................. 2012397.2

(51) Int. Cl.
*G08G 5/80* (2025.01)
*B64U 10/13* (2023.01)
(Continued)

(52) U.S. Cl.
CPC .............. *G08G 5/80* (2025.01); *B64U 10/13* (2023.01); *G05D 1/0022* (2013.01); *G05D 1/101* (2013.01);
(Continued)

(58) Field of Classification Search
CPC ..................................................... G08G 5/045
See application file for complete search history.

(56) References Cited

U.S. PATENT DOCUMENTS

| | | |
|---|---|---|
| 9,990,854 B1 | 6/2018 | Elmasry et al. |
| 11,410,562 B1 * | 8/2022 | Mishra ..................... G08G 5/53 |

(Continued)

OTHER PUBLICATIONS

Sohail, Razzaq et al., "Three-Dimensional UAV Routing With Deconfliction", IEEE Access (Apr. 24, 2018), vol. 6, pp. 21536-21551.

(Continued)

*Primary Examiner* — Imran K Mustafa
(74) *Attorney, Agent, or Firm* — Scully, Scott, Murphy & Presser, P.C.

(57) ABSTRACT

A controller for an unmanned vehicle is described. The controller comprises: a receiver for receiving a deconflicted route from a deconfliction engine, the deconflicted route comprising at least one waypoint; a first communications interface for enabling electrical communication between the controller and a corresponding communications interface on an unmanned vehicle; and a processor. The processor is configured to: receive the current position of the unmanned vehicle; generate a vehicle control signal for instructing the unmanned vehicle to perform a manoeuvre which moves the unmanned vehicle from its current position to the at least one waypoint; and transmit the vehicle control signal to the unmanned vehicle through the first communications interface. An unmanned vehicle, a system and method of controlling an unmanned vehicle are also described.

30 Claims, 3 Drawing Sheets

(51) Int. Cl.
    *G05D 1/00*           (2024.01)
    *G08G 5/20*           (2025.01)
    *G08G 5/34*           (2025.01)

(52) U.S. Cl.
    CPC ................. *G08G 5/20* (2025.01); *G08G 5/34*
            (2025.01); *B64U 2201/20* (2023.01); *G05D*
                                   *1/104* (2013.01)

(56) References Cited

U.S. PATENT DOCUMENTS

| | | | |
|---|---|---|---|
| 2017/0255580 A1 | 9/2017 | Parekh et al. | |
| 2018/0217614 A1* | 8/2018 | Salas-Moreno | B64U 50/19 |
| 2019/0019418 A1 | 1/2019 | Tantardini et al. | |
| 2019/0220042 A1* | 7/2019 | Guo | G08G 5/22 |
| 2020/0301427 A1* | 9/2020 | Restifo | G05D 1/0022 |
| 2020/0356115 A1* | 11/2020 | Kubie | G08G 5/26 |
| 2022/0351627 A1* | 11/2022 | Ali | G08G 5/53 |

OTHER PUBLICATIONS

2016, Anonymous, "ardupilot_wiki", URL: http://ardupilot.org/copter/docs/common-erle-brain-linux-autopilot.html.
International Search Report dated Sep. 14, 2021 issued in PCT/GB2021/051235.
GB Search Report dated Mar. 1, 2022 issued in GB2107278.0.

\* cited by examiner

VEHICLE CONTROLLER

FIELD

The present disclosure relates to a controller for controlling an unmanned vehicle, particularly but not exclusively an unmanned aerial vehicle. The present disclosure also relates to an unmanned vehicle having the same, and a system and a method of controlling an unmanned vehicle.

BACKGROUND

With the advent of commercially-available unmanned aerial vehicles (UAVs), it is becoming increasingly difficult to prevent collisions between them. While some UAVs, particularly larger or bespoke UAVs, operate under the control of an integrated programmable autopilot, most commercial-off-the-shelf (COTS) UAVs are not readily programmable and take input from a handheld flight controller operated by a user. Even those with an autopilot are not equipped for collision avoidance.

It would be advantageous to provide COTS UAVs with an ability to avoid collisions, particularly where a plurality are being controlled by a single user.

SUMMARY

According to a first aspect of the present disclosure, there is provided a controller for an unmanned vehicle, the controller comprising:

a receiver for receiving a deconflicted route from a deconfliction engine, the deconflicted route comprising at least one waypoint;

a first communications interface for enabling electrical communication between the controller and a corresponding communications interface on an unmanned vehicle; and a processor configured to:

receive the current position of the unmanned vehicle;

generate a vehicle control signal for instructing the unmanned vehicle to perform a manoeuvre which moves the unmanned vehicle from its current position to the at least one waypoint; and transmit the vehicle control signal to the unmanned vehicle through the first communications interface.

Advantageously, the controller tends to reduce the likelihood of collisions between unmanned vehicles by enabling automatic route deconfliction.

The receiver may be a wireless receiver. Alternatively, the receiver may be a wired interface such as a port for receiving a portable memory device having the deconflicted route. The port may be a universal serial bus (USB) port.

The controller may comprise storage means for storing the deconflicted route. The storage means may comprise a hard disk drive, a removable memory card or a solid state drive.

The first communications interface may comprise a wired interface. The wired interface may comprise a universal serial bus (USB) port, Ethernet port, or serial port, for example.

The controller may comprise attachment means for detachably coupling the controller to the unmanned vehicle. The attachment means may comprise a hook and loop material, magnet, clips, or screws, for example.

The controller may comprise a navigation system configured to determine the current position of the unmanned vehicle. The navigation system may comprise an inertial navigation system or a satellite navigation system, such as GPS, GLONASS or Galileo.

The deconflicted route may comprise desired arrival times corresponding to each waypoint in a set of waypoints, and the vehicle control signal may comprise an instruction to perform a manoeuvre which moves the unmanned vehicle from its current position to each of the waypoints at the corresponding arrival times.

The vehicle control signal may comprise at least one of a bearing/direction of travel, travel time, speed, and altitude.

The controller may comprise a deconfliction engine for performing route deconfliction on a received desired route for the unmanned vehicle, wherein the deconfliction engine comprises:

an interface for receiving location information for at least one obstacle; and a processor for determining if a conflict exists whereby the at least one obstacle intercepts the desired route, and generating the deconflicted route not intercepted by the at least one obstacle.

The desired route may be time-dependent, such that a conflict is only determined to exist if the obstacle is determined to cross a point on (in other words, intercept) the desired route at the time the unmanned vehicle is also at the point. The point may be a two- or three-dimensional region of airspace. The two- or three-dimensional region of airspace may be time-dependent and/or dependent on the size of the unmanned vehicle.

The deconfliction engine may automatically resolve the conflict(s) by replanning the desired route to generate a deconflicted route.

According to a second aspect of the present disclosure, there is provided an unmanned vehicle comprising:

a controller according to any one of the preceding claims for generating a vehicle control signal for the unmanned vehicle;

a second communications interface for cooperating with the first communications interface to receive the vehicle control signal from the controller;

at least one propulsion unit for generating thrust to move the unmanned vehicle; and a processor for controlling the power and/or direction of the thrust in accordance with the received vehicle control signal.

The unmanned vehicle may comprise an on-board navigation system for determining the current position of the unmanned vehicle, wherein the navigation system is configured to transmit the current position of the unmanned vehicle to the controller through the second communications interface. The on-board navigation system may comprise an inertial navigation system or a satellite navigation system, such as GPS.

The unmanned vehicle may be an unmanned aerial vehicle and wherein the deconflicted route is a deconflicted flight plan.

According to a third aspect of the present disclosure, there is provided a system comprising:

the controller according to the first aspect;

a terminal for creating a desired route for an unmanned vehicle, and a device transmitter for transmitting the desired route for the unmanned vehicle through a network to a deconfliction engine;

a deconfliction engine comprising:

an interface for receiving position information relating to at least one obstacle;

a receiver for receiving the desired route for the unmanned vehicle; and a processor for performing route deconfliction on the desired route and generating a deconflicted route in which conflicts with the at least one obstacle are minimised.

The terminal may comprise a user interface for receiving the desired route. The terminal may generate the desired route using a start point and end point received through a user interface.

The deconfliction engine may comprising storage means for storing the received position information.

The interface for receiving the position information may be a network connection, for example an Internet connection.

The desired route may be time-dependent, such that a conflict is only determined to exist if the obstacle is determined to cross a point on (in other words, intercept) the desired route at the time the unmanned vehicle is also at the point. The point may be a two- or three-dimensional region of airspace. The two- or three-dimensional region of airspace may be time-dependent and/or dependent on the size of the unmanned vehicle.

The deconfliction engine may automatically resolve the conflict(s) by replanning the route to generate a deconflicted route.

The obstacle may be, for example, a weather pattern, terrain feature, or a vehicle. The vehicle may be static or moving. In other words, the position information may be a route for a vehicle.

The terminal may be a mobile phone. Alternatively, the terminal may be a tablet or personal computer. The terminal may be communicatively coupled with the deconfliction engine through the Internet.

The deconfliction engine may comprise a wireless transmitter for transmitting the deconflicted route to the controller. The deconfliction engine and controller may be communicatively coupled using any suitable communications link, such as an Internet Protocol (IP) standard, Wi-Fi, Bluetooth, a broadband cellular link (e.g. 4G, 5G), or a Tactical Data Link (e.g. Link 22). Alternatively, the deconfliction engine may comprise a wired interface for exchanging data (i.e. the deconflicted route) with the controller when coupled thereto.

According to a fourth aspect of the present disclosure, there is provided a method of controlling an unmanned vehicle, comprising storing position information relating to at least one obstacle;

receiving a desired route for the unmanned vehicle from a terminal of a deconfliction engine; and performing route deconfliction on the desired route and generating a deconflicted route in which conflicts with the at least one obstacle are minimised;

receiving the deconflicted route at a controller for the unmanned vehicle;

generating a vehicle control signal for instructing the unmanned vehicle to perform a manoeuvre which moves the unmanned vehicle from its current position to the at least one waypoint; and transmitting the vehicle control signal to the unmanned vehicle through a communications interface.

The method may comprise wirelessly transmitting the deconflicted route from the deconfliction engine to the controller.

The method may comprise receiving the desired route for the unmanned vehicle from a user input, and transmitting the desired route for the unmanned vehicle to the deconfliction engine for performing route deconfliction.

The method may comprise generating the desired route based on a start and end point received through a user interface.

It will be appreciated that features described in relation to one aspect of the present disclosure can be incorporated into other aspects of the present disclosure. For example, an apparatus of the disclosure can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Embodiments of the disclosure will now be described by way of example only and with reference to the accompanying drawings.

For convenience and economy, the same reference numerals are used in different figures to label identical or similar elements.

DETAILED DESCRIPTION

Generally, embodiments herein relate to a vehicle controller that can be coupled to an unmanned vehicle, after manufacture, in order to provide the unmanned vehicle with an ability to avoid collisions. Preferably, the vehicle controller receives a route from a server for the unmanned vehicle to follow. The server is provided with software that receives a desired route and uses the position of obstacles, such as other vehicles, to generate a new route free of collisions. The following description will be drawn to unmanned aerial vehicles (otherwise known as drones or UAVs), such as commercial UAVs for delivering packages from distributors.

Figure 1:
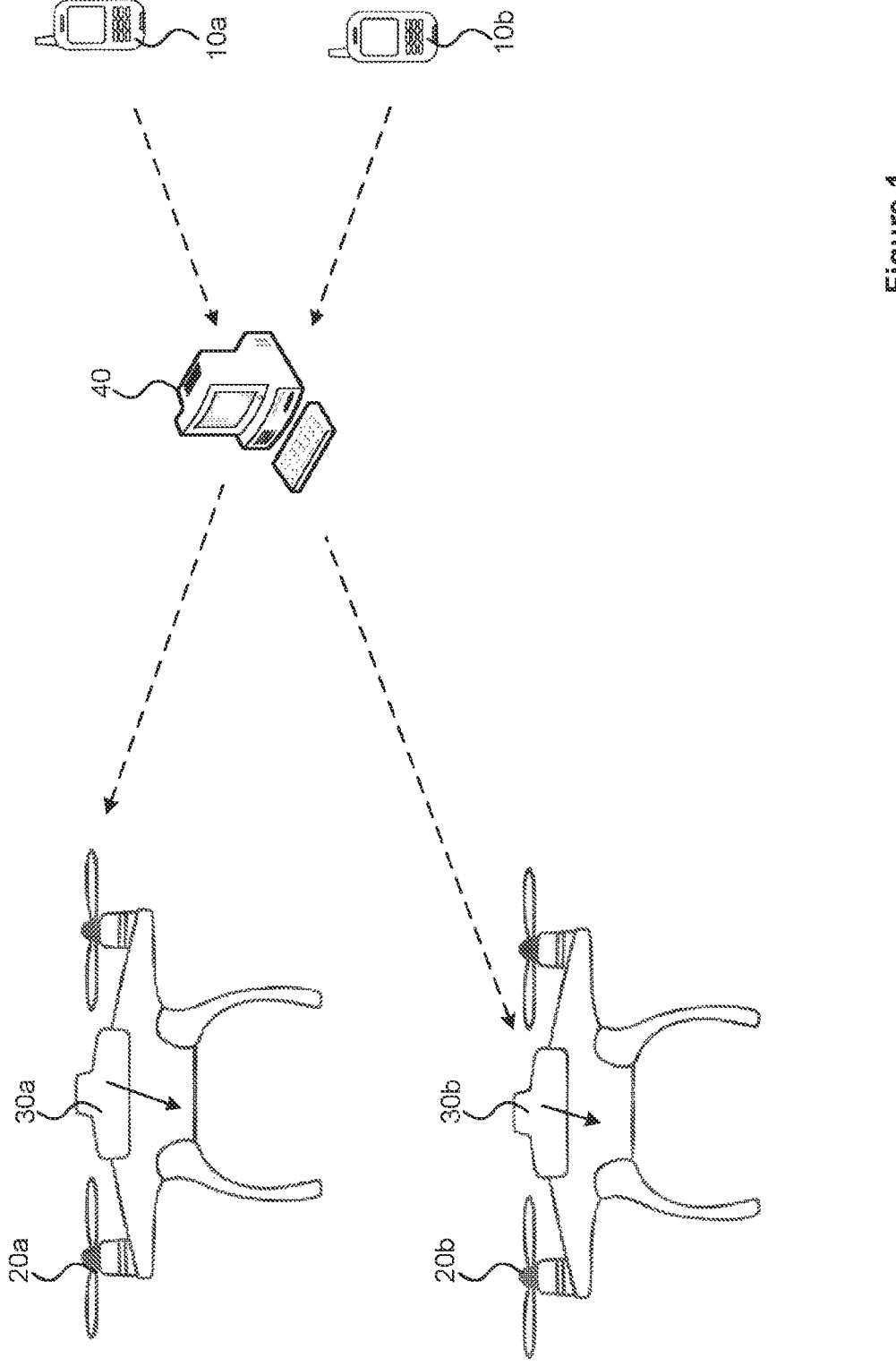
FIG. 1 is a systematic view of a system for controlling an unmanned aerial vehicle, according to an embodiment.

Unmanned aerial vehicles 20a, 20b (generally 20) having respective individual vehicle controllers 30a, 30b (generally 30) coupled thereto are illustrated in FIG. 1. While two UAVs 20 are illustrated, this is not intended to be limiting. There may be only one UAV 20 in the system, or a plurality of UAVs in the system. The unmanned aerial vehicle 20 is in the form of a multicopter (e.g. a quadcopter), which is a typical form-factor for COTS UAVs. While the embodiments that follow will refer to flight paths, flight planning and aircraft, it would be understood this is in relation to specific embodiments and not intended to limit the concept to air travel. For example, in other embodiments, the unmanned vehicle may be an unmanned or optionally-manned ground vehicle, spacecraft or watercraft. Throughout, "unmanned" will be assumed to have a broad definition encompassing optionally-manned vehicles not being directly operated by a human (i.e. vehicles having a degree of autonomy).

The unmanned aerial vehicle(s) 20 may be controlled in normal, or conventional, operation by a user of a remote controller. The user may be based in a ground station. According to an embodiment, each UAV 20 is provided with a vehicle controller 30, which provides the respective UAV 20 with the ability to autonomously follow a programmed route. That route is received from a deconfliction engine 40 (i.e. server). The route is planned by said deconfliction engine 40 such that if a vehicle were to follow it, said vehicle would not collide with any other obstacle. Such obstacles include other aircraft, where their routes have been submitted to the deconfliction engine. Therefore, the route received by the vehicle controller 30 is known as the deconflicted route.

The vehicle controller 30 may receive the deconflicted route from the deconfliction engine 40 by a wireless communications link. The wireless link may be a Bluetooth, WiFi, Tactical Datalink (e.g. Link-16) or a broadband telecommunications link (such as LTE and 5G), for example. Alternatively, the vehicle controller 30 may receive the deconflicted route by a wired connection with the deconfliction engine 40, such as an Ethernet or USB link. Finally, the deconflicted route may be transferred from the deconfliction engine 40 to the vehicle controller 30 using a portable memory device, such as a USB "stick".

The vehicle controller 30 is an independent unit attached to the outside of the UAV 20. The vehicle controller 30 may be coupled to the UAV 20 by any suitable means, such as straps, an adhesive substance, a magnet, hook-and-loop material, a clasp, a bracket, or an elastic band. The vehicle controller 30 may alternatively be heat-bonded or chemically bonded to the UAV 20, although it would be preferred for the vehicle controller 30 to be detachable such that the UAV 20 can return to its original control regime, or so the vehicle controller 30 can be swapped for another module or upgraded.

The vehicle controller 30 is electrically coupled to the UAV 20 by means of an interface. This will be described in more detail with reference to FIG. 2. In one embodiment, the vehicle controller 30 receives position information from the UAV 20. In another embodiment, the vehicle controller 30 is provided with a navigation system for providing position information. The vehicle controller 30 compares its current position with the deconflicted route, and in response generates instructions which would move the UAV 20 to which it is attached to the next waypoint along the route. For example, at the present time the UAV 20 may be at a first waypoint in the deconflicted route, and the vehicle controller 30 therefore generates a movement plan that would move the UAV 20 from the first waypoint to a second waypoint in the deconflicted route.

The UAV 20 may need to arrive at a waypoint at a particular time or within a timeframe in order to avoid a collision. From the desired arrival time and current position relative to the waypoint, the vehicle controller 30 can calculate the desired speed of the UAV 20 which would allow it to arrive at the waypoint at the specified time. The vehicle controller 30 may also, or alternatively, determine a bearing (i.e. heading, direction of movement), orientation, and altitude for the UAV 20 that would allow it to arrive at the waypoint or otherwise satisfy the conditions of the deconflicted route. In other embodiments, where the UAV 20 is instead a train or car, for example, the vehicle controller

30 may determine a track, path or road for the vehicle to follow which would be pre-programmed into the UAV 20.

The determined vehicle control instructions are then transmitted to the UAV 20 through the interface. An onboard controller of the UAV 20 then uses the vehicle control instruction to determine the necessary flight control inputs and controls flight control surfaces or propulsion systems accordingly to achieve the requested vehicle control instructions. The UAV 20 therefore then moves to follow the deconflicted route.

In the illustrated embodiment, a deconfliction engine 40 is in wireless communication with the plurality of vehicle controllers 30. The deconfliction engine 40 may belong to an entity such as a logistics company, national air traffic service or military organisation, having a plurality of UAVs 20 associated with it. In other words, the deconfliction engine 40 may be a server that receives route s for UAVs from a wide range of users and entities; an apparatus/server for a single organisation operating a plurality of UAVs 20; or an apparatus for a single user of a UAV 20 that is networked with other deconfliction engines or route planners. In the latter case, the deconfliction engine 40 may be integrated with the vehicle controller 30. The UAVs 20 may be for delivering packages, for example. Alternatively, the UAVs 20 may be communication nodes in a military tactical network.

The deconfliction engine 40 is in communication with at least one terminal device 10a, 10b (generally, 10). These may be desktop computers, laptops or tablets on the same network (e.g. a LAN) as the deconfliction engine for allowing a user to interface with the deconfliction engine 40. Alternatively, the terminal devices 10 may include mobile phones comprising a software application for planning a route. Terminal devices 10 may communicate with the deconfliction engine 40 through the Internet. In other words, the deconfliction engine 40 may generate web page/portal which is presented to the user on their terminal device 10 in order to input waypoints or plan a desired route.

The deconfliction engine 40 may receive a start point (e.g. the current position of the UAV 20) for a route and a desired end point (e.g. where a package needs to be delivered). The deconfliction engine 40 may be arranged to plan a route between the two points. The route is planned such that the UAV does not collide with any known objects such as vehicles (e.g. UAVs, balloons), terrain (e.g. mountains) or weather patterns (such as storm regions). The objects may be moving; in other words, collisions may be calculated based on route s for objects.

Alternatively, the user may plan a desired route using a terminal device 10. The desired route is then transmitted to the deconfliction engine 40. The deconfliction engine 40 modifies the desired route to create a deconflicted route in which collisions with known objects are avoided. A user may be presented with a message on their terminal device 10 to approve the modified (i.e. deconflicted) route before it is stored and/or transmitted to the vehicle controller 30. Alternatively, where the object to be avoided is another vehicle, the user may be presented with an interface for re-planning the route for that other vehicle or contact details for the operator of that other vehicle.

In one embodiment, the vehicle controllers 30 are arranged to transmit navigation data (e.g. their position, velocity and/or heading) to the deconfliction engine 40. The deconfliction engine 40 is arranged to use this navigation data to perform route deconfliction. Route deconfliction may first involve extrapolating a route of each UAV 20 using the respective navigation data. For example, if a UAV 20 is shown to be at a first location at a first time, and its speed and direction of travel are transmitted to the deconfliction engine 40, the deconfliction engine 40 can calculate its position at a second time. Deconfliction may then involve generating new routes for the UAVs 20 that prevent their collision if the original routes are shown to intersect. In other words, the "end point" explained above may be a predicted end point. Alternatively, where original routes are shown to intersect and where the deconfliction engine 40 is provided with a terminal having a user interface, a user may manually generate a new route for each UAV 20 to remove the conflict(s).

In order to perform collision avoidance, the deconfliction engine 40 may have the locations or routes of other objects (or, in other words, entities), such as manned aircraft, aerostats, storm fronts or terrain features stored in memory. This data may be received through the internet, via a databus or may be pre-stored. For example, the deconfliction engine 40 may receive map data, such as topography data or architectural data. The map data may indicate the elevation or maximum vertical extent of terrain features (e.g. mountains) or buildings, along with their locations. The map data may be received from a remote server via a communications link, or may be downloaded to a memory on the deconfliction engine 40. The deconfliction engine 40 may also have access to national air traffic data systems, other deconfliction engines/route planners, or have an Automatic Dependent Surveillance-Broadcast (ADS-B) input, so that it knows the location and trajectory (or flight paths) of other aircraft. The deconflicted routes may be generated so as to avoid collision between the UAVs 20 and these objects (in addition to avoiding collision between the UAVs 20 themselves, where one deconfliction engine 40 services a plurality of UAVs 20). Alternatively, a user may programme the deconfliction engine 40 with the desired routes for each UAV 20. The deconfliction engine 40 is provided with a route deconfliction algorithm.

Each deconflicted route is then transmitted back to the vehicle controller 30 coupled to the UAV 20 associated with the respective route. As illustrated, the route is transmitted to the vehicle controller 30 over-the-air. The vehicle controllers 30 may be coupled to the deconfliction 40 via a network, for example a wide area network (WAN) or local area network (LAN). The deconflicted routes may be installed on the vehicle controllers 30 via a wired connection with the deconfliction engine 40 or data transfer device prior to flight.

The deconflicted route is a path through a three-dimensional region of airspace, and therefore may indicate a sequential set of coordinates and altitudes. In other words, the deconflicted route is a plan for moving a UAV 20 from a start position to a final position. The deconflicted route may be a set of waypoints. There may be conditions attached to those waypoints, such as the UAV 20 cannot be orientated in a particular direction for EMCON (emissions control) reasons, or for security reasons where the UAV 20 has a camera. The deconflicted route may further include the velocity at which the UAV 20 should fly between coordinates or an expected time of arrival at particular coordinates (from which velocity can be calculated by the vehicle controller 30).

Preferably, the vehicle controller 30 is reprogrammable to receive alternative deconflicted routes. Preferably, the vehicle controller 30 is a "plug and play" device capable of electronic communication with any UAV 20 having a corresponding interface, such that it can be used to control alternative UAVs to that which it is attached.

In one embodiment, the route deconfliction algorithm defines a three-dimensional region of potential conflict around part of the or each received or generated desired route. The three-dimensional region may be representative both of the uncertainty in the position of the UAV 20 and of a region of air exclusion appropriate for the UAV 20 or for the respective received route. The three-dimensional region of potential conflict is time-dependent, in that it moves along the route to align with the expected position of the associated UAV 20 at that point in time. When it is determined that an object (such as another three-dimensional region of potential conflict for another UAV 20) will enter or intersect the time-dependent three-dimensional region of potential conflict, a conflict is extant. The deconfliction algorithm may then warn a user (for example, with a displayed message) if their desired route has a conflict so they can replan and generate a new deconflicted route having knowledge of the conflict, or the algorithm automatically calculates a deconflicted route to avoid such an event.

Instead of a three-dimensional region, the deconfliction engine may generate a two-dimensional region of potential conflict. This is advantageous when the vehicle controller 30 is used to control a ground vehicle or surface vessel, where altitude is not a factor.

In another embodiment, the deconfliction algorithm determines a conflict to exist if an object crosses the desired route at a time the UAV 20 is expected to be at that point. In other words, the point of conflict is an infinitesimally small point in time and space, rather than a three-dimensional region.

In some embodiments, the vehicle controller 30 comprises at least one sensor for determining live situational awareness data. This situational awareness data, as with the map data, may be used to adapt or determine a route for the UAV 20. Live situational awareness data may indicated the presence of another aircraft or object moving into the path of the UAV 20, for example. The sensor may be an optical camera, radar, sonar, hyperspectral imaging device, infrared camera, etc. The sensor may comprise a laser range finder for determining the distance to a detected object. The sensor may comprise image recognition software to identify clouds and other object types. The situational awareness data may be transmitted to the deconfliction engine 40 so that the deconfliction engine 40 can modify the determined route. Modifying a route may involve instructing the UAV 20 to accelerate, such that the object passes behind the UAV 20; slow down; or change direction. The deconfliction engine 40, or a processor on-board the vehicle controller 30, may calculate the speed and direction of travel of the object and the point of likely intersection with the UAV 20 if it remains on the route presently being followed. This may be achieved by monitoring how far the object (or aircraft) travels in a known amount of time. The laser range finder or radar may be used for this purpose. Alternatively to the deconfliction engine 40, the vehicle controller 30 itself may be configured to modify the stored route to control the UAV 20 to avoid the object (or other aircraft).

Figure 2:
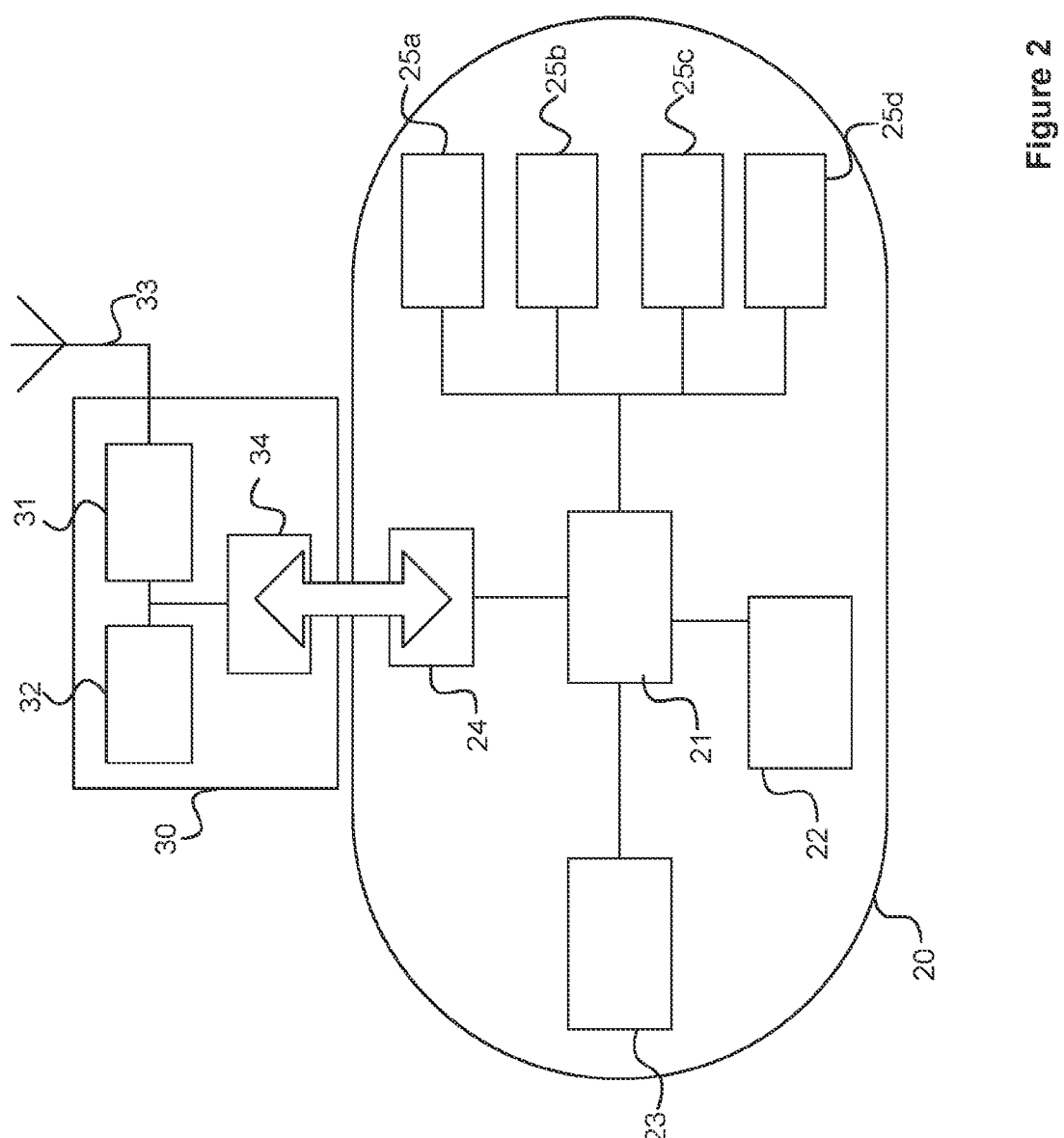
FIG. 2 is a systematic view of an unmanned aerial vehicle having a vehicle controller coupled thereto, according to an embodiment.

An embodiment of a vehicle controller 30 coupled to a UAV 20 is illustrated in more detail in FIG. 2. Here, the vehicle controller 30 is for receiving and storing a predetermined route (i.e. a deconflicted route) and generating control signals (i.e. control inputs) for controlling the UAV 20 to follow the route. The route is a flight plan. The route is stored in a memory 32. The memory 32 may be a non-volatile memory such as read only memory (ROM), a hard disk drive (HDD) or a solid state drive (SSD). The memory 32 may include random access memory (RAM). RAM is used by a controller 31 of the vehicle controller 30 for the temporary storage of data. The memory 32, in alternative embodiments, may comprise a route deconfliction algorithm used by the controller 31 in planning a route. In other embodiments, the controller 31 is for generating control instructions that, when performed by the UAV 20, move the UAV 20 follow the deconflicted route.

In the illustrated embodiment, a route is initially programmed by a user using their mobile device (e.g. mobile phone), which is a terminal device 10. The mobile device uses an application and user interface to receive a desired route from a user. This initial, desired, route is transmitted to and stored on the deconfliction engine 40. The deconfliction engine 40 has access to a plurality of other routes each associated with other UAVs 20 and/or manned aircraft. These other routes may be received from the same mobile device (i.e. the same user), or a plurality of mobile devices, or are accessible on another server via a network.

The deconfliction engine 40 performs route deconfliction on the stored routes to generate a deconflicted route for the UAV 20 to follow. The deconflicted route may be the same as the initial route, if there were no conflicts with other UAVs or objects.

This deconflicted route is transmitted to the vehicle controller 30 and stored in the memory 32. The memory 32 may contain a unique identifier, such as a MAC address, serial number or email address, to set the vehicle controller apart from other vehicle controllers with which the deconfliction engine 40 is in communication. The deconflicted route is received via a receiver 33. The receiver 33 may be a GSM, CDMA, LTE, WiMax, future 5G standards or the like within the 698-3600 MHz spectrum region receiver. The receiver 33 may be a Bluetooth, Zigbee, or Wi-Fi receiver. While the antenna of the receiver 33 is illustrated as being located outside the body of the vehicle controller 30, it would be understood that this is for illustrative purposes only and it may instead reside inside the body. The antennas may take any suitable form, such as etched antennas, monopole antennas, dipole antennas, blade antennas or patch antennas.

The receiver 33 may instead be a wired interface such as a co-axial port, serial port, USB interface, or Ethernet interface. Transmitting the deconflicted route may comprise connecting the vehicle controller 30 to the deconfliction engine 40 via the wired interface, or using a port to receive a deconflicted route from a portable storage device.

As explained above, in other embodiments, the vehicle controller 30 may determine a route for the UAV 20 to follow based on situational awareness data received from sensors. The sensors may be onboard the UAV 20 or onboard the vehicle controller 30. Therefore, the vehicle controller 30 may include sensors, such as a radar or optical camera, for detecting aerial objects to avoid such as other aircraft or weather patterns. This sensor data may be used as part of the routing process (e.g. by first being transmitted to the server 40), or may be used directly by the vehicle controller 30 to deviate from a route where unexpected obstacles arise.

The vehicle controller 30 is provided with an electrical coupling 34 and the UAV 20 is provided with a corresponding electrical coupling 24. The electrical couplings 24, 34, when connected, provide an electrical interface that allows the vehicle controller 30 to transmit control instructions to the UAV 20. The electrical interface may be a wired interface, such as an Ethernet, USB or HDMI connection. Alternatively, the vehicle controller 30 and the UAV 20 may be electrically coupled by a wireless interface.

In one embodiment, the vehicle controller 30 comprises a navigation system, such as an inertial navigation system including a gyroscope and/or compass. The navigation system may alternatively or additionally include a satellite navigation system receiver such as GPS or GLONASS. The navigation system generates navigation data such as the location, heading and velocity of the UAV 20. Control instructions are generated by the controller 31 by comparing the UAV's current location with the closest waypoint in the deconflicted route, and using an algorithm to determine the most effective way to move the UAV 20 from its current position to the waypoint. The algorithm may comprise a cost reduction function. The control instructions contain information such as heading, altitude and velocity. The control instructions may be packaged into a control signal.

In another embodiment, the vehicle controller 30 does not comprise a navigation system. Instead, the vehicle controller 30 receives the navigation data for generating the control instructions from the UAV 20 through the interface (i.e. through the electrical coupling 34).

The controller 31 may take any suitable form. For instance, it may be a microcontroller, plural microcontrollers, a processor, or plural processors. The controller 31 is arranged to generate control signals for controlling the UAV 20 to manoeuvre to follow the deconflicted route stored in the memory 32. A set of control instructions may be generated by the controller 31, whereby each control instruction defines a manoeuvre, which, if all executed by the UAV 20, causes the UAV 20 to follow the stored route.

The electrical couplings 34 and 24 may together also provide a mechanical interface, such as a catch or friction connection, for removably attaching the vehicle controller 30 to the UAV 20. Alternatively, the vehicle controller 30 may be provided with a separate mechanical attachment means. In preferred embodiments, the mechanical coupling requires no modification of the UAV 20 itself to secure the vehicle controller 30. The mechanical attachment means may include any suitable securing means, such as an adhesive layer, magnet or a strap that wraps around the body of the UAV 20. The vehicle controller 30 and UAV 20 may be provided with a separate mechanical interface such as a clasp, hook and loop material. The vehicle controller 30 may be screwed, bolted or clipped to the body of the UAV 20.

In the illustrated embodiment, the UAV 20 is a commercial-off-the-shelf (COTS) quadcopter aircraft weighing about 15 kg and having diameter of less than 1 metre. However, this is not intended to be limiting, and it would be understood that the vehicle controller 30 may be coupled to an unmanned vehicle of any size or configuration to provide that vehicle with the ability to avoid collisions with other objections, including other aircraft.

The UAV 20 may be solar-electric powered (where the power source is not shown in the Figure). However, in other embodiments, the primary power source of the UAV 20 may be hybrid, battery only, hydrogen, or hydrocarbon based.

The UAV 20 comprises a controller 21. The controller 21 may take any suitable form. For instance, it may be a microcontroller, plural microcontrollers, a processor, or plural processors. The controller 21 is arranged to receive control signals received through the electrical coupling 24. The controller 21 decodes the control signals to be able to process the control instructions contained therein. The control signals contain instructions, which, when executed by the controller 21, cause the UAV 20 to move according to follow the deconflicted route.

The UAV 20 depicted in the Figures is a quadcopter-type unmanned aerial vehicle, with four propulsion units 25*a-d* that can be adjusted to control pitch/attitude, velocity, orientation, heading and lift of the UAV 20. In other embodiments, the UAV 20 may take a different form, such as that of a traditional aeroplane, helicopter, airship, vertical take-off and/or landing aircraft, or balloon. Therefore, in other embodiments, the vehicle may comprise less than or more than four propulsion units 25a-d. In these embodiments, the vehicle comprises flight control surfaces such as rotors, elevators, ailerons, flaps, and propellers. The controller 21 may execute the instructions in the control signal by independently controlling each of the propulsion units 25a-d to increase or decrease the velocity of the UAV 20. The controller 21 is arranged to generate control instructions to control the propulsion units 25a-d (or other flight control surfaces) to change the heading and/or orientation and/or altitude and/or attitude and/or velocity of the UAV 20 such that it follows the route stored in the memory 32 of the vehicle controller 30.

The UAV 20 may include a sensor. The sensor may be for gathering intelligence (for example, imagery intelligence) along a route, sensing objects to avoid, or for assisting a user when controlling the UAV 20 manually using the remote controller. The sensor may be an optical camera, for example. The sensor may additionally or alternatively comprise a radar, LIDAR or a signals intelligence device.

The UAV 20 includes a memory 22. The memory 22 may be a non-volatile memory such as read only memory (ROM), a hard disk drive (HDD) or a solid state drive (SSD). The memory 22 stores, amongst other things, an operating system. The memory 22 may include random access memory (RAM). RAM is used by the controller 21 for the temporary storage of data. The operating system may contain code which, when executed by the controller 21 in conjunction with RAM, controls operation of each of hardware components of the UAV 20.

The UAV 20 is provided with a navigation system 23. The navigation system 23 generates navigation data which is transmitted to the vehicle controller 30. The navigation data may be packaged into a data signal and transmitted though the electrical couplings 24, 34 forming the interface. The navigation data may indicate the current location of the UAV 20. The navigation data may indicate the altitude, orientation and/or heading of the UAV 20. The navigation system may be an inertial navigation system or a satellite navigation receiver. The navigation system may comprise an altimeter. Examples of satellite navigation receivers include Galileo, GLONASS and GPS receivers. Where the vehicle controller 30 comprises its own onboard navigation system, the UAV's navigation system 23 may not be provided.

A method of controlling an unmanned vehicle, specifically but not exclusively a UAV 20, to follow a route (or in the specific embodiment, a flight plan) and avoid collisions will now be described with reference to FIG. 3.

In a first step, S300, a processor of the deconfliction engine 40 receives a desired route for a UAV 20 to follow. The desired route may be generated by a terminal device 10 when a user enters a start and end point for a journey, may be generated by and received from another module of the deconfliction engine 40, or may be entered manually by the user using a using a user interface of the terminal device 10.

At step S301, the deconfliction engine 40 determines if the desired route (or an exclusion region around it) is intercepted by the route of an obstacle. The obstacle may be static, such as a mountain (so, in effect, its route is fixed in space and time), or another aircraft. Positional information about these obstacles may be stored in a memory of the deconfliction engine 40, or may be accessed via a network connection.

If there is a conflict present in the desired route, at step S302 the deconfliction engine 40 either replans the route to remove the conflict or informs the user so that they can input corrections to the desired route to remove the conflict. This deconflicted route is then stored. Alternatively, where the desired route does not contain any conflicts, this is stored as the deconflicted route. The deconflicted route may be later used when routes for other UAVs 20 are planned.

At step S303, the deconflicted route is transmitted to the vehicle controller 30, in this case a flight controller for a UAV 20. The vehicle controller is coupled to the UAV 20. The vehicle controller 30 may receive the deconflicted route from the deconfliction engine 40 by a wired connection, portable storage device, or over a wireless connection. The generated deconflicted route is transmitted to the associated vehicle controller 30 using its unique identifier. For example, a message containing the deconflicted route may be transmitted to the vehicle controller 30 on a data carrier with a serial number (or IP or MAC address) of the vehicle controller 30 contained in a packet header.

At step S304, the vehicle controller 30 uses the present known position of the UAV 20 to determine a manoeuvre, or set of manoeuvres, which when executed would cause the UAV 20 to follow the deconflicted route (i.e. move from one waypoint to the next). The vehicle controller 30 generates a control signal having instructions to perform this manoeuvre (or these manoeuvres). The instruction may set out a velocity (airspeed or ground speed), time of arrival, altitude, travel time and/or direction of travel. A new control signal outlining a new manoeuvre may be generated when the waypoint is reached, such as to stop, land, or change direction.

The control signal(s) is/are transmitted to the UAV 20 through a communications interface, such as a wired interface.

The UAV 20 receives the control signal from the vehicle controller 30. The processor 21 of the UAV 20 decodes the control signal to determine the manoeuvre instruction. The controller 21 then controls flight control surfaces, for example propulsion units 25a-d, to adjust such that the UAV 20 performs the instructed manoeuvre in order to follow the deconflicted route.

Figure 3:
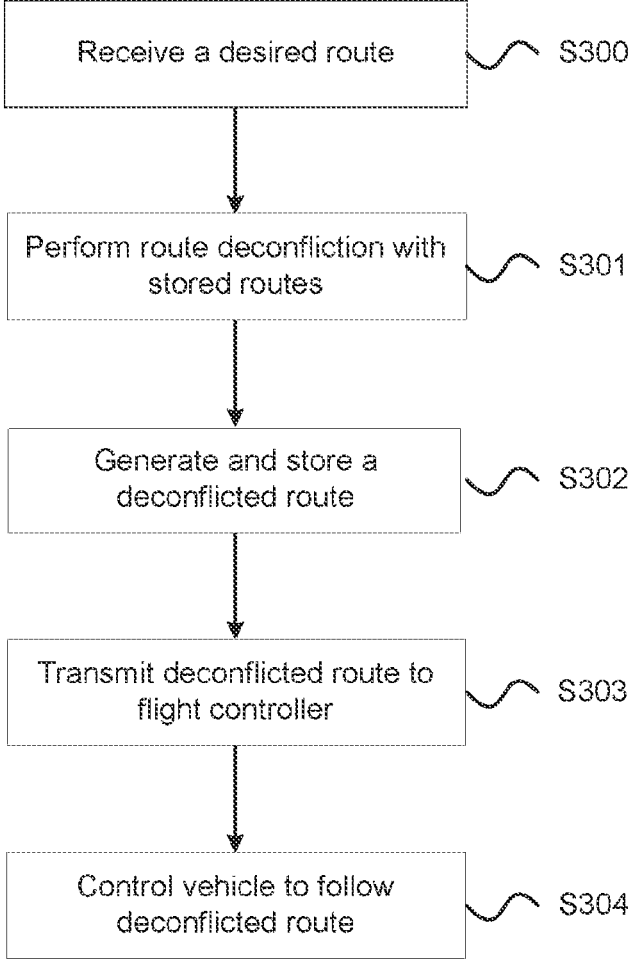
FIG. 3 is a flowchart illustrating a method of controlling an unmanned vehicle according to an embodiment.

The order of the steps presented in FIG. 3 is not intended to be limiting. In other words, the steps may be carried out in a different order, or simultaneously, without deviating from the scope of the present invention.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. A controller for an unmanned vehicle, the controller being removably attached to an outside of a housing of the unmanned vehicle and configured to move with the unmanned vehicle to each waypoint in a set of waypoints in a deconflicted route, the controller comprising:

a receiver external to the unmanned vehicle, for receiving a target route for the unmanned vehicle from a terminal device, the terminal device being a different device from the unmanned vehicle and the controller;

a first communications interface for enabling electrical communication between the controller and a corresponding communications interface on the unmanned vehicle; and a processor configured to:

obtain a current position of the unmanned vehicle;

obtain position information related to at least one obstacle;

perform route deconfliction on the target route by determining if a conflict exists whereby the at least one obstacle intercepts the target route and obtain from the terminal device another target route or automatically generate the deconflicted route not intercepted by the at least one obstacle, where the deconflicted route comprises arrival times corresponding to each waypoint in the set of waypoints, wherein the processor is configured to determine if the at least one obstacle intercepts the target route based on the current position of the unmanned vehicle and a time-dependent virtual three-dimensional region which surrounds the unmanned vehicle and virtually travels with the unmanned vehicle as the unmanned vehicle travels along the target route and the position information, where the at least one obstacle intercepts the target route if the at least one obstacle is predicted to overlap in both space and time the time-dependent virtual three-dimensional region;

generate a vehicle control signal comprising an instruction for the unmanned vehicle to perform a manoeuvre which moves the unmanned vehicle from its current position to each of the waypoints in the set of waypoints at the arrival times corresponding to each waypoint; and transmit the vehicle control signal to the unmanned vehicle through the first communications interface.

2. The controller according to claim 1, wherein the first communications interface comprises a wired interface.

3. The controller according to claim 1, comprising attachment means for detachably coupling the controller to the outside of the housing of the unmanned vehicle.

4. The controller according to claim 1, comprising a navigation system configured to determine the current position of the unmanned vehicle.

5. The controller according to claim 1, wherein the processor is configured to predict a movement of the at least one obstacle based on the position information, where the position information comprises speed and direction of travel.

6. The controller according to claim 1, wherein the vehicle control signal comprises at least one of a bearing, seed, and altitude.

7. The controller according to claim 1, wherein obtaining the position information relating to at least one obstacle comprises at least one of: retrieving from storage a prestored map having topography data or architectural data, receiving data from an air traffic control system, or receiving data from another vehicle.

8. An unmanned vehicle comprising:

a controller according to claim 3 for generating and transmitting the vehicle control signal for the unmanned vehicle;

a second communications interface for cooperating with the first communications interface to receive the vehicle control signal from the controller;

at least one propulsion unit for generating thrust to move the unmanned vehicle; and a processor for controlling the power and/or direction of the thrust in accordance with the received vehicle control signal.

9. The unmanned vehicle according to claim 8, comprising an on-board navigation system for determining the current position of the unmanned vehicle, wherein the on-board navigation system is configured to transmit the current position of the unmanned vehicle to the controller through the second communications interface.

10. The unmanned vehicle according to claim 8, wherein the unmanned vehicle is an unmanned aerial vehicle and wherein the deconflicted route is a deconflicted flight plan.

11. A system comprising:

the controller according to claim 1, and further configured to generate a user interface to be displayed on the terminal device; and the terminal device configured to receive from the controller the user interface and to display the user interface, in response to displaying the user interface, the terminal device is configured to receive an input to create the target route for the unmanned vehicle and transmit the target route to the controller.

12. The system according to claim 11, wherein the terminal device is a mobile phone.

13. The system according to claim 11, wherein prior to transmitting the vehicle control signal to the unmanned vehicle, the controller is configured to transmit the deconflicted route to the terminal device and the terminal device is configured to display the deconflicted route for confirmation.

14. The system according to claim 11, wherein the position information relating to at least one obstacle comprises a route for a vehicle.

15. The system of claim 13, wherein the terminal device is configured to:

receive an updated target route via the user interface and transmit the updated target route to the controller; or generate via the user interface the new target route.

16. The controller according to claim 6, wherein the vehicle control signal further comprises special instructions for at least one waypoint.

17. The controller according to claim 5, wherein the determining further comprises predicting a movement of the at least one obstacle based on the position information.

18. The controller according to claim 17, wherein the position information related to at least one obstacle also comprises a time-dependent virtual region, which moves along a route of the at least one obstacle.

19. The controller according to claim 18, wherein the time-dependent virtual region associated with the at least one obstacle is a three-dimensional area.

20. The controller according to claim 1, further comprising a sensor configured to obtain the position information related to at least one obstacle.

21. The controller according to claim 20, wherein the sensor comprises at least one of laser range finder, an optical camera, a radar, a sonar, a hyperspectral imaging device, or an infrared camera.

22. The controller according to claim 1, wherein the controller is configured to obtain the current position of the unmanned vehicle by receiving the current position from the unmanned vehicle via the first communications interface.

23. The controller according to claim 1, wherein the first communications interface is configured to both enable electrical communication between the controller and a corresponding communications interface on the unmanned vehicle and to provide a mechanical interface to removably attach the controller to the unmanned vehicle without an additional attachment means.

24. The controller according to claim 4, wherein the navigation system comprises a satellite navigation system receiver.

25. The controller according to claim 1, further comprising an additional communications interface configured to communicate with the terminal device or another external system.

26. A method of controlling an unmanned vehicle using a controller removably attached to an outside of a housing of the unmanned vehicle subject to the controlling and where the controller moves with the unmanned vehicle to each waypoint in a set of waypoints in a deconflicted route, the method comprising:

obtaining position information relating to at least one obstacle;

receiving at the controller which is removably attached to the outside of the housing, a target route for the unmanned vehicle from a terminal device, the terminal device being a different device from the unmanned vehicle and the controller;

performing route deconfliction on the route by determining if a conflict exists whereby the at least one obstacle intercepts the target route and obtaining a new target route or automatically generating the deconflicted route not intercepted by the at least one obstacle, where the deconflicted route comprises arrival times corresponding to each waypoint in the set of waypoints, the determining comprising using the current position of the unmanned vehicle, a time-dependent virtual three-dimensional region which surrounds the unmanned vehicle and virtually travels with the unmanned vehicle as the unmanned vehicle travels along the target route and the position information, where it is determined that the at least one obstacle intercepts the target route if the at least one obstacle is predicted to overlap in both space and time the time-dependent virtual three-dimensional region;

generating a vehicle control signal comprising an instruction for the unmanned vehicle to perform a manoeuvre which moves the unmanned vehicle from its current position to each of the waypoints in the set of waypoints at the arrival times corresponding to each waypoint; and transmitting the vehicle control signal to the unmanned vehicle through a communications interface.

27. The method of controlling an unmanned vehicle according to claim 26, further comprising:

attaching the controller to the outside of the housing of the unmanned vehicle subject the controlling and controlling the unmanned vehicle according to claim 26.

28. The method of controlling an unmanned vehicle according to claim 27, further comprising removing controller from the unmanned vehicle and reattaching the controller to another unmanned vehicle.

29. The method of controlling an unmanned vehicle according to claim 28, wherein the unmanned vehicle and the another unmanned vehicle is an unmanned aerial vehicle and wherein the deconflicted route is a deconflicted flight plan.

30. The method of controlling an unmanned vehicle according to claim 26, wherein the controller is attached to the outside of the housing of the unmanned vehicle by at least one of: straps, an adhesive substance, a magnet, hook-and-loop material, a clasp, a bracket, or an elastic band.

* * * * *